(12) United States Patent
Rafaeli et al.

(10) Patent No.: US 10,007,799 B2
(45) Date of Patent: Jun. 26, 2018

(54) WORKFLOW AND USER CREDENTIALS

(71) Applicant: HEWLETT PACKARD ENTERPRISE DEVELOPMENT LP, Houston, TX (US)

(72) Inventors: Sandro Rafaeli, Plano, TX (US); Augusto Guilherme Goncalves Ludtke, Porto Alegre (BR)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 160 days.

(21) Appl. No.: 15/023,363

(22) PCT Filed: Sep. 23, 2013

(86) PCT No.: PCT/US2013/061139
§ 371 (c)(1),
(2) Date: Mar. 18, 2016

(87) PCT Pub. No.: WO2015/041694
PCT Pub. Date: Mar. 26, 2015

(65) Prior Publication Data
US 2016/0203329 A1    Jul. 14, 2016

(51) Int. Cl.
*G06F 21/62* (2013.01)
*G06F 21/31* (2013.01)
*G06Q 10/10* (2012.01)

(52) U.S. Cl.
CPC .......... *G06F 21/6218* (2013.01); *G06F 21/31* (2013.01); *G06Q 10/103* (2013.01)

(58) Field of Classification Search
CPC .... G06F 21/6218; G06F 21/31; G06Q 10/103
USPC ...................................... 726/26–30
See application file for complete search history.

(56) References Cited

U.S. PATENT DOCUMENTS

| | | | |
|---|---|---|---|
| 7,577,649 B2 * | 8/2009 | Wu | G06F 17/30578 |
| 8,261,233 B2 | 9/2012 | Szpak et al. | |
| 8,453,159 B2 | 5/2013 | Appelbaum et al. | |
| 9,589,250 B2 * | 3/2017 | Palanisamy | |
| 9,703,974 B1 * | 7/2017 | Surkatty | G06F 21/6218 |
| 2002/0138543 A1 | 9/2002 | Teng et al. | |
| 2004/0078105 A1 † | 4/2004 | Moon et al. | |
| 2004/0172445 A1 * | 9/2004 | Singh | G06Q 10/10 709/200 |

(Continued)

OTHER PUBLICATIONS

Fostering Scientific Workflow Preservation through Discovery of Substitute Services, Belhajjame et al, 10.1109/eScience.2011.22, IEEE, 2011 (Year: 2011).*

(Continued)

*Primary Examiner* — Jahangir Kabir
(74) *Attorney, Agent, or Firm* — Hewlett Packard Enterprise Patent Department

(57) ABSTRACT

A hardware processor may execute instructions to execute at least one request from a plurality of profiles with corresponding credentials used to access inputs from at least one source of input, and the credential corresponds to a placeholder tag corresponding to a particular task of the workflow. In some examples, the source of input may be adjusted based on the requests and the association corresponding to the respective profiles.

12 Claims, 3 Drawing Sheets

(56) References Cited

U.S. PATENT DOCUMENTS

| | | |
|---|---|---|
| 2006/0271390 A1* | 11/2006 | Rich .................. G06F 8/20 |
| | | 717/100 |
| 2007/0033079 A1 | 2/2007 | Rits et al. |
| 2007/0113289 A1* | 5/2007 | Blumenau ......... G06F 17/30085 |
| | | 726/26 |
| 2007/0208602 A1† | 9/2007 | Nocera et al. |
| 2010/0114782 A1 | 5/2010 | Candelore |
| 2012/0116980 A1 | 5/2012 | Mercuri |
| 2012/0197975 A1 | 8/2012 | Samson et al. |
| 2012/0311662 A1* | 12/2012 | Abnous ............. G06F 17/30607 |
| | | 726/1 |
| 2013/0073724 A1 | 3/2013 | Parashar et al. |
| 2013/0205373 A1 | 8/2013 | Jaudon et al. |

OTHER PUBLICATIONS

Cheung, W.K. et al; Towards Privacy Aware Data Analysis Workflows for e-science; http://www.isi.edu/~gil/papers/cheung-gil-aaai-ses-07.pdt; May 9, 2007.

PCT Search Report/Written Opinion ~ Application No: PCT/US2013/061139 dated Jun. 9, 2014 ~ 10 pages.

\* cited by examiner
† cited by third party

WORKFLOW AND USER CREDENTIALS

BACKGROUND

A workflow may define a sequence of tasks that may be executed in a predefined order to produce a designated outcome. Input to a given task in the workflow may come from output generated by an earlier task in the sequence. Alternatively, a given task may use an external source as input.

DETAILED DESCRIPTION

As noted above, a workflow may define a sequence of tasks that may be executed in a predefined order to produce a designated outcome. A workflow manager may be used as a component of a workflow automation program. Workflow managers may interpret a workflow definition, access the input resources, and execute each task. With the advent of the cloud, input data for the workflow may be located across different network locations. When executing cloud based workflows, a task may need to access a remote repository on the cloud that requires authentication before reading the data. These credentials may be hardcoded in the task definition or entered manually by a user. If a workflow definition contains the right credentials, the input may be obtained.

Workflows may be shared among different individuals that require access to different repositories on a network or cloud. In this instance, each user of the workflow may have their own set of input/output resources with different authentication credentials. While the workflow definitions may be shared among the users in a public repository, the credentials and data locations may be private to each user. Unfortunately, this may be problematic for large entities with many users executing many workflows daily.

In view of the foregoing, disclosed herein are a system, non-transitory computer readable medium, and method for managing workflows. In one example, credentials in a user profile may be used to access data for a workflow. In another example, each source of input and the credentials of each source of input may be associated with a tag contained in the workflow. In another example, a given tag in the workflow may be substituted with a source of input associated with the given tag and with credentials of the source of input associated with the given tag. Thus, rather than hard coding data sources in the workflow or requiring users to enter details of the data sources, a workflow can dynamically adjust its data sources based on the user requesting the workflow. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
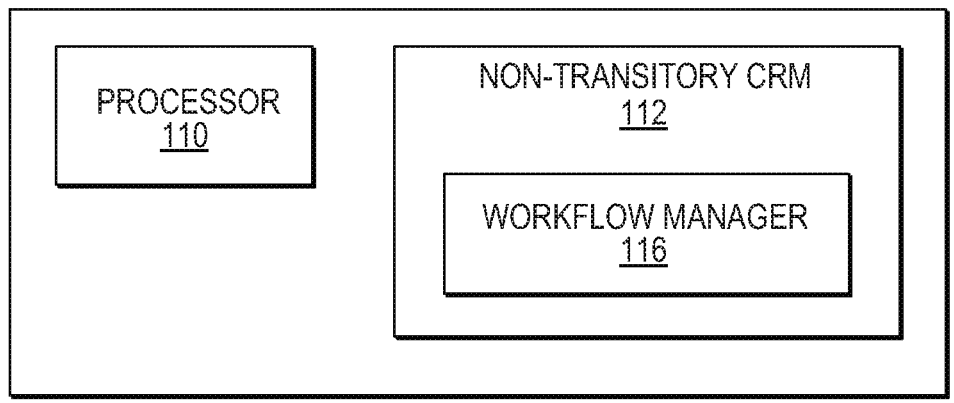
FIG. 1 is a block diagram of an example system in accordance with aspects of the present disclosure.

FIG. 1 presents a schematic diagram of an illustrative computer apparatus 100 depicting various components in accordance with aspects of the present disclosure. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network using conventional protocols (e.g., Ethernet, Wi-Fi, Bluetooth, etc.). The computer apparatus 100 may also contain at least one processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. As will be discussed in more detail below, the instructions may include a workflow manager 116. Non-transitory CRM 112 may be used by or in connection with any instruction execution system that can fetch or obtain the logic from non-transitory CRM 112 and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions illustrated herein (e.g., workflow manager 116) may comprise any set of instructions to be executed directly (such as machine code) or indirectly (such as scripts) by processor 110. In this regard, the terms "instructions," "scripts," and "applications" may be used interchangeably. The computer executable instructions may be stored in any computer language or format, such as in object code or modules of source code. Furthermore, it is understood that the instructions may be implemented in the form of hardware, software, or a combination of hardware and software and that the examples herein are merely illustrative.

In one example, at least one workflow may comprise a series of tasks executable by a computer. In another example, workflow manager 116 may instruct processor 110 to read a request by a user to execute a workflow. In yet a further example, workflow manager 116 may instruct processor 110 to read a user profile associated with the user. The user profile may specify at least one source of input to the workflow and may specify credentials for accessing the at least one source of input. In a further aspect, the workflow may be executed using the source of input specified in the user profile such that the workflow uses the credentials to access the source of input.

Figure 2:
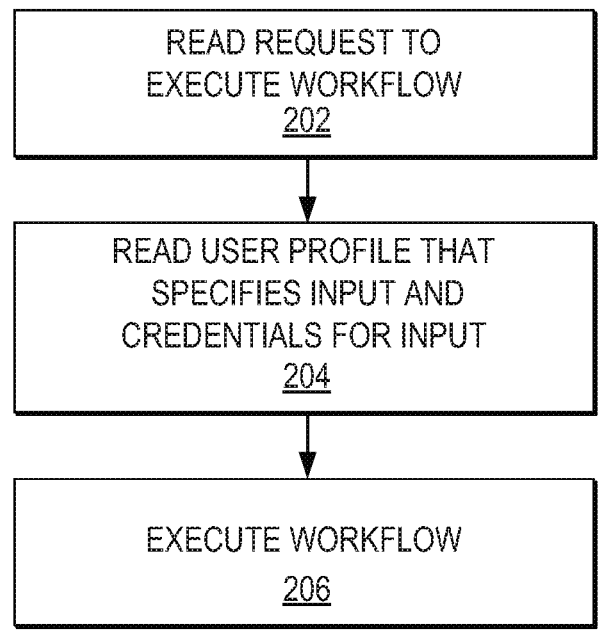
FIG. 2 is a flow diagram of an example method in accordance with aspects of the present disclosure.
Figure 3:
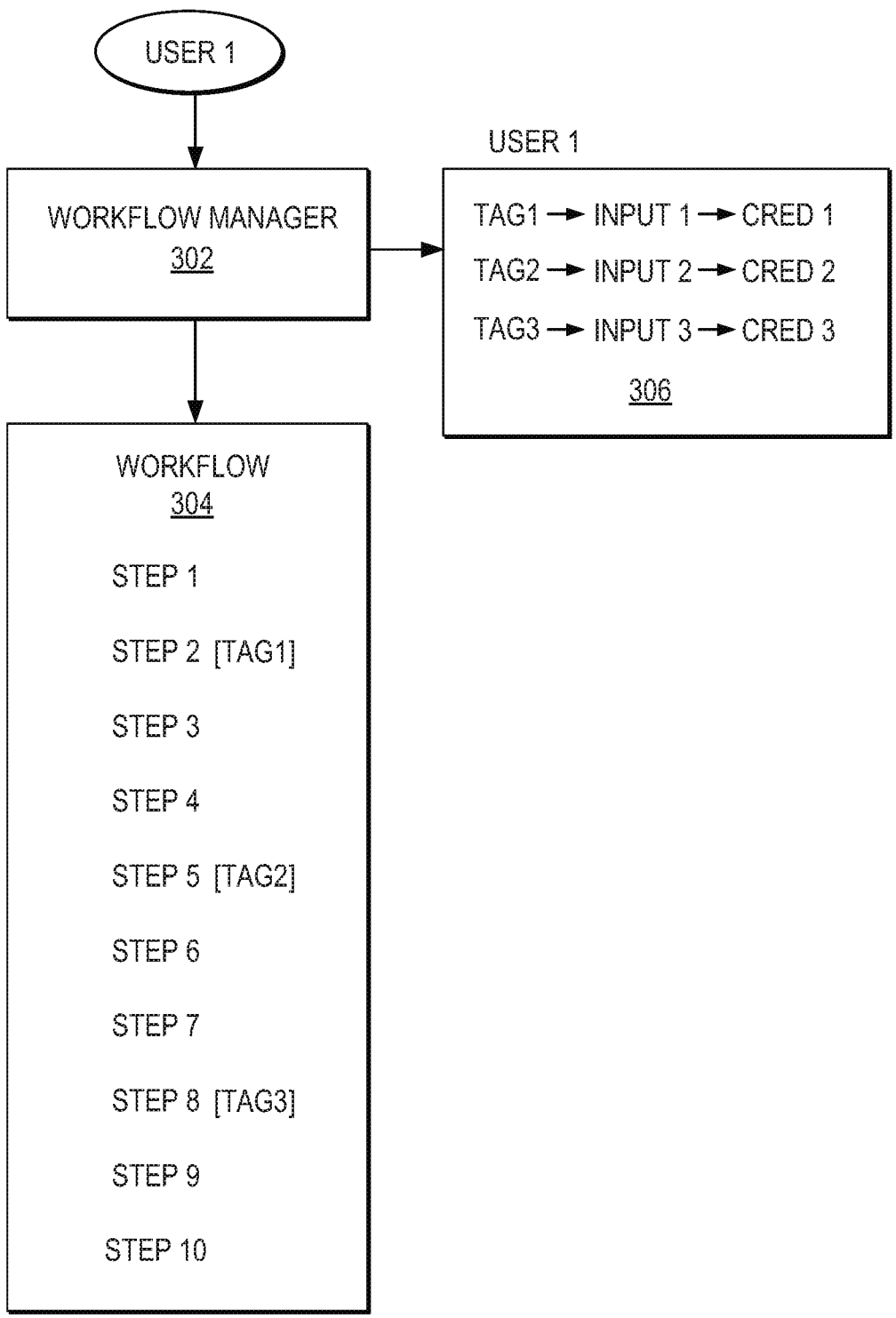
FIG. 3 is a working example in accordance with aspects of the present disclosure.
Figure 4:
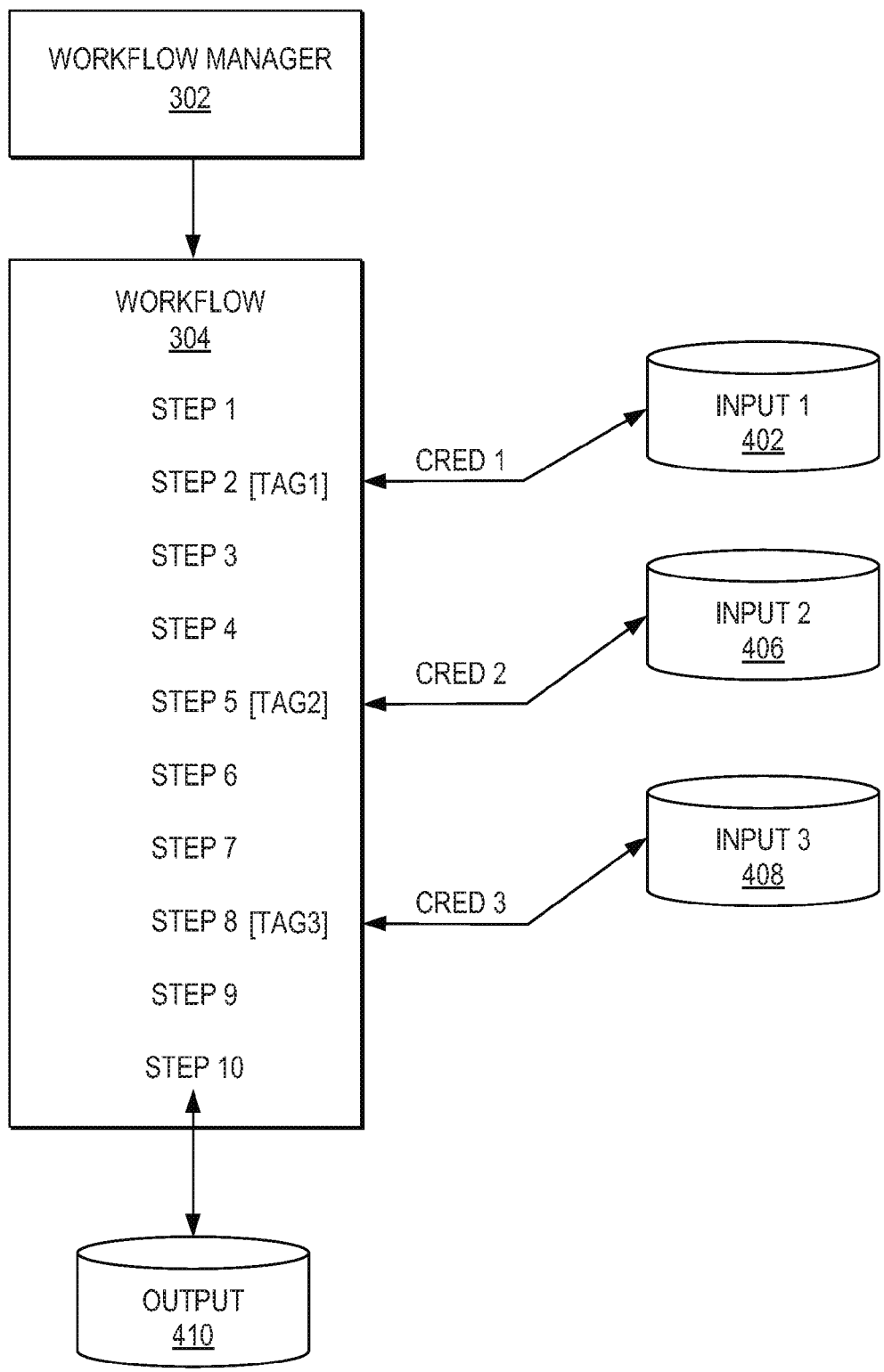
FIG. 4 is a further working example in accordance with aspects of the present disclosure.

Working examples of the system, method, and non-transitory computer-readable medium are shown in FIGS. 2-4. FIG. 2 illustrates a flow diagram of an example method 200 for managing workflows. FIGS. 3-4 each show a working example in accordance with the techniques disclosed herein. The actions shown in FIGS. 3-4, will be discussed below with regard to the flow diagram of FIG. 2.

Referring now to FIG. 2, a request to execute a workflow may be read, as shown in block 202. In block 204, a user profile that specifies at least one source of input and that specifies credentials for at least one source of input may be read. Referring now to FIG. 3, workflow manager 302 may receive a request from User 1. User profile 306 specifies example associations that workflow manager 302 may use to locate data sources for workflow 304. In this example, each source of input and the credentials of each source of input in user profile 306 may be associated with a tag contained in workflow 304. Workflow 304 is an example workflow with ten tasks. In this example, STEP 2, STEP 5, and STEP 8 of workflow 304 are associated with TAG 1, TAG 2, and TAG 3 respectively. In one example, a tag may be defined as a place holder in the workflow that may be substituted with other data. User profile 306 shows an association between TAG 1 and INPUT 1. In this example, INPUT 1 is a data source. In turn, INPUT 1 is associated with CRED 1 and CRED 1 may be the credentials for logging into INPUT 1. As with TAG 1, TAG 2 and TAG 3 are also associated with INPUT 2 and INPUT 3 respectively. In turn, INPUT 2 and INPUT 3 are associated with CRED 2 and CRED 3 the credentials for logging into INPUT 2 and INPUT 3 respectively). The example associations shown in FIG. 3 are merely illustrative and it is understood that the associations may be arranged in a variety of ways.

Referring back to FIG. 2, the workflow may be executed, as shown in block 206. Referring now to FIG. 4, workflow manager 302 may substitute a given tag in the workflow with a source of input associated with the given tag and with credentials of the source of input associated with the given tag. FIG. 4 shows TAG 1 being substituted with the network location of INPUT 1 and its credentials CRED 1; TAG 2 is shown being substituted with the network location of INPUT 2 and its credentials CRED 2; finally, TAG 3 is shown being substituted with the network location of INPUT 3 and its credentials CRED 3. Thus, in this example, STEP 2 will login to INPUT 1 in repository 402 using CRED 1 for authentication; STEP 5 will login to INPUT 2 in repository 406 using CRED 2 for authentication; finally, STEP 8 will login to INPUT 3 in repository 408 using CRED 3 for authentication. By replacing the tags with a source of input data and the credentials for logging into the source of input data, the input may be dynamically adjusted based on the associations in the user profile.

FIG. 4 also shows an output to repository 410. In one example, a new user profile may be associated with at least one data repository that may be used for either input or output by a given workflow. The new user profile may also be associated with credentials to access the at least one data repository. By way of example, STEP 10 is shown generating an output to repository 410. In one aspect, STEP 10 may also be associated with a tag that is replaceable with the location and the credentials of an output repository specified in a user profile. Thus, the output locations of the workflow may also be dynamically changed.

Advantageously, the foregoing computer apparatus, non-transitory computer readable medium, and method execute workflows that can dynamically change where input is read from and where output is written to. In this regard, tags may be placed in areas of the workflow that require the reading or writing of data. These tags may be replaced automatically with details provided in a user profile or some other source. In turn, users with different input and output requirements may share the same workflow regardless of where their repositories are located and regardless of the credentials for accessing their repositories.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, processes may be performed in a different order or concurrently and steps may be added or omitted.

The invention claimed is:

1. A system comprising:
at least one hardware processor;
at least one workflow comprising a series of tasks executable by a computer;
a workflow manager comprising instructions executable by the at least one hardware processor to:
execute a first request to execute a workflow;
execute a first profile including at least one source of input to the workflow, and the first profile includes a first credential for accessing a first input of a first source of input, wherein the first credential corresponds to a tag, wherein the tag is a placeholder corresponding to a particular task of the workflow;
execute the workflow using the first input of the first source of input included in the first profile, wherein the workflow uses the first credential to access the first input of the first source of input, and wherein the workflow instructs the at least one hardware processor to output data to a data repository included in the first profile;
execute a second request to execute the workflow;
execute a second profile corresponding to the second request, and the second profile includes a second input of a second source of input to the workflow, wherein the workflow uses a second credential to access the second input of the second source of input and wherein the second credential corresponds to the tag corresponding to the particular task of the workflow; and
adjust the at least one source of input based at least in part on the first request, the second request and at least one association corresponding to the first profile and the second profile by substituting the tag in the workflow.

2. The system of claim 1, wherein the first and the second source of input corresponds to the first and the second credential and each of the first and the second source of input are associated with the tag contained in the workflow.

3. The system of claim 1, wherein the workflow manager upon execution instructs the at least one hardware processor to substitute the tag in the workflow with the first source of input associated with the tag and with the first credential of the first source of input associated with the tag.

4. The system of claim 1, wherein the workflow manager upon execution instructs the at least one hardware processor to associate a third profile with at least one data repository to be used for input or output by the workflow and to associate the third profile with a third credential to access the at least one data repository.

5. A non-transitory computer readable medium having instructions therein which, if executed, instruct at least one hardware processor to:
   execute a first request to execute a workflow comprising a series of tasks;
   locate a first profile associated with the first request in which the first profile includes at least one data repository to use as input to the workflow and the first profile includes a first credential to allow access to a first data repository, wherein the first credential corresponds to a tag, wherein the tag is a placeholder corresponding to a particular task of the workflow;
   execute the workflow, wherein the workflow to login to the first data repository included in the first profile using the first credential included in the first profile, and wherein the workflow instructs the at least one hardware processor to output data to the first data repository included in the first profile;
   execute a second request to execute the workflow;
   locate a second profile included with the second request in which the second profile includes a second data repository to use as input to the workflow and in which the second profile includes a second credential to allow access to the second data repository, wherein the second credential corresponds to the tag corresponding to the particular task of the workflow; and
   adjust the at least one data repository based at least in part on the first request, the second request and at least one association corresponding to the first profile and the second profile by substituting the tag in the workflow.

6. The non-transitory computer readable medium of claim 5, wherein the first and the second data repository and the first and the second credential included in the first profile and the second profile respectively are associated with the tag contained in the workflow.

7. The non-transitory computer readable medium of claim 5, wherein the instructions executed instruct the at least one hardware processor to substitute the tag in the workflow with an input associated with the first credential of the input associated with the first profile.

8. The non-transitory computer readable medium of claim 5, wherein the instructions executed instruct the at least one hardware processor to associate a third profile with a third data repository to be used for input or output by the workflow and to associate the third profile with a third credential to access the third data repository.

9. A method comprising:
   executing, by at least one hardware processor, a first request to execute a workflow comprising a series of tasks residing in a public repository;
   locating, using the at least one hardware processor, a first profile associated with the first request;
   determining, using the at least one hardware processor, whether the first profile includes at least one source of data to use as input to the workflow;
   determining, using the at least one hardware processor, whether the first profile includes a credential to allow access to a first source of data, wherein the credential corresponds to a tag, wherein the tag is a placeholder corresponding to a particular task of the workflow;
   initiating, using the at least one hardware processor, the workflow to login to the first source of data with the credential corresponding to the first profile, wherein the workflow instructs the at least one hardware processor to output the first source of data to a data repository associated with the first profile;
   executing a second request to execute the workflow;
   executing a second profile corresponding to the second request, wherein the second profile includes a second source of data to use as input to the workflow, and wherein the workflow uses a second credential to access the second source of data, and wherein the second credential corresponds to the tag corresponding to the particular task of the workflow; and
   adjusting the at least one source of data based at least in part on the first request, the second request, and at least one association corresponding to the first profile and second profile by substituting the tag in the workflow.

10. The method of claim 9, wherein the input and the credential of the input correspond to the tag contained in the workflow.

11. The method of claim 9, further comprising substituting, using the at least one hardware processor, the tag in the workflow with the input corresponding to the tag and with the credential of the input associated with the first profile.

12. The method of claim 9, further comprising:
   associating, using the at least one hardware processor, the second profile with at least one data repository to be used for input or output by the workflow;
   associating, using the at least one hardware processor, the second profile with the credential to access the at least one data repository; and
   substituting, using the at least one hardware processor, the tag in the workflow with the input associated with the credential of the second profile.

* * * * *